(12) United States Patent
Fujieda et al.

(10) Patent No.: US 8,447,097 B2
(45) Date of Patent: May 21, 2013

(54) CALIBRATION APPARATUS AND METHOD FOR ASSISTING ACCURACY CONFIRMATION OF PARAMETER FOR THREE-DIMENSIONAL MEASUREMENT

(75) Inventors: Shiro Fujieda, Kyoto (JP); Atsushi Taneno, Kyoto (JP); Hiroshi Yano, Toyonaka (JP); Yasuyuki Ikeda, Ikeda (JP)

(73) Assignee: Omron Corporation, Kyoto (JP)

( * ) Notice: Subject to any disclaimer, the term of this patent is extended or adjusted under 35 U.S.C. 154(b) by 612 days.

(21) Appl. No.: 12/711,814

(22) Filed: Feb. 24, 2010

(65) Prior Publication Data

US 2010/0232684 A1   Sep. 16, 2010

(30) Foreign Application Priority Data

Mar. 12, 2009   (JP) .................................. 2009-059920
Jan. 13, 2010   (JP) .................................. 2010-004929

(51) Int. Cl.
*G06K 9/00* (2006.01)
*G06K 9/36* (2006.01)

(52) U.S. Cl.
USPC ........... 382/154; 382/141; 382/144; 382/145; 382/151; 382/181; 382/287

(58) Field of Classification Search
USPC ................ 382/154, 141, 144, 145, 181, 287, 382/151
See application file for complete search history.

(56) References Cited

U.S. PATENT DOCUMENTS

| | | | |
|---|---|---|---|
| 5,864,632 A | 1/1999 | Ogawa et al. | |
| 6,278,798 B1 | 8/2001 | Rao | |
| 6,330,356 B1 | 12/2001 | Sundareswaran et al. | |
| 6,445,815 B1 | 9/2002 | Sato | |
| 6,480,627 B1 | 11/2002 | Mathias et al. | |
| 6,915,072 B2 * | 7/2005 | Takahashi et al. | 396/296 |
| 7,003,136 B1 | 2/2006 | Harville | |
| 7,167,583 B1 | 1/2007 | Lipson et al. | |
| 7,231,081 B2 * | 6/2007 | Snow et al. | 382/151 |

(Continued)

FOREIGN PATENT DOCUMENTS

| | | |
|---|---|---|
| JP | 10-122819 | 5/1998 |
| JP | 10-160464 A | 6/1998 |

(Continued)

OTHER PUBLICATIONS

Fiala, et al. Canada. National Research Council Canada. Fully Automatic Camera Calibration Using Self-Identifying Calibration Target. Ottawa: NRC-CNRC, 2005. Print.*

(Continued)

*Primary Examiner* — Michael A Newman
(74) *Attorney, Agent, or Firm* — Foley & Lardner LLP (57) ABSTRACT

When computation of a three-dimensional measurement processing parameter is completed, accuracy of a computed parameter can easily be confirmed. After a parameter for three-dimensional measurement is computed through calibration processing using a calibration workpiece in which plural feature points whose positional relationship is well known can be extracted from an image produced by imaging, three-dimensional coordinate computing processing is performed using the computed parameter for the plural feature points included in the stereo image used to compute the parameter. Perspective transformation of each computed three-dimensional coordinate is performed to produce a projection image in which each post-perspective-transformation three-dimensional coordinate is expressed by a predetermined pattern, and the projection image is displayed on a monitor device.

3 Claims, 7 Drawing Sheets

U.S. PATENT DOCUMENTS

| | | | |
|---|---|---|---|
| 7,277,599 | B2 | 10/2007 | Eian et al. |
| 7,526,121 | B2 | 4/2009 | Ban et al. |
| 8,126,260 | B2 * | 2/2012 | Wallack et al. ............... 382/154 |
| 8,170,295 | B2 | 5/2012 | Fujii et al. |
| 8,295,588 | B2 * | 10/2012 | Fujieda et al. ............... 382/154 |
| 2002/0187831 | A1 | 12/2002 | Arikawa et al. |
| 2003/0152276 | A1 | 8/2003 | Kondo et al. |
| 2004/0051783 | A1 | 3/2004 | Chellappa et al. |
| 2004/0153671 | A1 | 8/2004 | Schuyler et al. |
| 2004/0247174 | A1 | 12/2004 | Lyons et al. |
| 2005/0084149 | A1 | 4/2005 | Aizawa et al. |
| 2005/0111703 | A1 | 5/2005 | Merbach et al. |
| 2005/0249400 | A1 * | 11/2005 | Fukumoto .................... 382/154 |
| 2005/0249434 | A1 | 11/2005 | Xu et al. |
| 2005/0280645 | A1 | 12/2005 | Nagata et al. |
| 2005/0286767 | A1 | 12/2005 | Hager et al. |
| 2006/0050087 | A1 | 3/2006 | Tanimura et al. |
| 2006/0182308 | A1 * | 8/2006 | Gerlach et al. ............... 382/100 |
| 2006/0232583 | A1 | 10/2006 | Petrov et al. |
| 2007/0014467 | A1 | 1/2007 | Bryll |
| 2007/0081714 | A1 * | 4/2007 | Wallack et al. ............... 382/152 |
| 2008/0025616 | A1 | 1/2008 | Bryll |
| 2008/0123937 | A1 * | 5/2008 | Arias Estrada et al. ....... 382/154 |
| 2008/0212887 | A1 | 9/2008 | Gori et al. |
| 2008/0260227 | A1 | 10/2008 | Hayashi et al. |
| 2008/0303814 | A1 | 12/2008 | Ishiyama |
| 2009/0222768 | A1 | 9/2009 | Roe et al. |
| 2009/0309893 | A1 | 12/2009 | Boothroyd et al. |
| 2010/0231690 | A1 | 9/2010 | Fujieda et al. |
| 2010/0231711 | A1 | 9/2010 | Taneno et al. |
| 2010/0232647 | A1 | 9/2010 | Fujieda et al. |
| 2010/0232681 | A1 | 9/2010 | Fujieda et al. |
| 2010/0232682 | A1 | 9/2010 | Fujieda et al. |
| 2010/0232683 | A1 | 9/2010 | Fujieda et al. |
| 2011/0150280 | A1 | 6/2011 | Tsuji |
| 2011/0218776 | A1 | 9/2011 | Shono et al. |
| 2012/0050525 | A1 | 3/2012 | Rinner et al. |

FOREIGN PATENT DOCUMENTS

| | | |
|---|---|---|
| JP | 10-269362 A | 10/1998 |
| JP | 2961264 | 8/1999 |
| JP | 2000-094374 A | 4/2000 |
| JP | 2005-017286 A | 1/2005 |
| JP | 2006-250889 | 9/2006 |
| JP | 2007-064836 A | 3/2007 |
| JP | 2007-249592 | 9/2007 |

OTHER PUBLICATIONS

"CameraCalibration: Calibrating method for stereo cameras." Sentience: A 3D volumetric perception system for mobile robots. Google Code, Aug. 20, 2009. Web. Mar. 11, 2013. <http://code.google.com/p/sentience/wiki/CameraCalibration>.*

USPTO Final Office Action on U.S. Appl. No. 12/710,266 dated Jul. 16, 2012; 16 pages.

USPTO Non-final Office Action on U.S. Appl. No. 12/711,976 dated Jun. 26, 2012; 12 pages.

USPTO Notice of Allowance on U.S. Appl. No. 12/711,028 dated Jun. 22, 2012; 11 pages.

USPTO Notice of Allowance on U.S. Appl. No. 12/711,196 dated Jun. 13, 2012; 11 pages.

Zhengyou Zhang, A Flexible New Technique for Camera Calibration, Technical Report MSR-TR-98-71; Dec. 2, 1998, Microsoft Research, Microsoft Corporation, Redmond, WA 98052.

Kawai, Y. et al., "Stereo Correspondence Using Segment Connectivity", Journal of Information Processing, vol. 40, No. 8, Aug. 1999, pp. 3219-3229.

USPTO Notice of Allowance on U.S. Appl. No. 12/711,179 dated Jan. 27, 2012; 12 pages.

USPTO Office Action on U.S. Appl. No. 12/710,266 dated Feb. 23, 2012; 11 pages.

USPTO Non-final Action on U.S. Appl. No. 12/711,018 dated Jun. 4, 2012; 14 pages.

USPTO Non-final Action on U.S. Appl. No. 12/711,028 dated Mar. 16, 2012; 12 pages.

USPTO Notice of Allowance on U.S. Appl. No. 12/711,179 dated Mar. 15, 2012; 6 pages.

Paglieroni, David W.; Short Communication—A Unified Distance Transform Algorithm and Architecture; Machine Vision and Applications (1992) 5:47-55.

USPTO Final Office Action on U.S. Appl. No. 12/711,018 dated Sep. 18, 2012; 13 pages.

USPTO Final Office Action on U.S. Appl. No. 12/711,976 mailed Dec. 11, 2012; 10 pages.

USPTO Non-final Office Action on U.S. Appl. No. 12/710,266 mailed Oct. 24, 2012; 13 pages.

U.S. Appl. No. 13/633,536, filed Oct. 2, 2012, Shiro et al.

USPTO action on U.S. Appl. No. 12/711,018 mailed Dec. 31, 2012; 13 pages.

USPTO Final Office Action on U.S. Appl. No. 12/710,266 mailed Jan. 29, 2013; 12 pages.

USPTO Non-final Office Action on U.S. Appl. No. 12/712,015 mailed Jan. 29, 2013; 16 pages.

Japan Patent Office action on application 2009-059919 mailed Mar. 12, 2013; pp. 1-3; with partial English translation.

Japan Patent Office action on applicaton 2009-059921 mailed Mar. 12, 2013; pp. 1-3; with partial English translation.

* cited by examiner

EVALUATED VALUE : 0.329

FIG. 8

EVALUATED VALUE : 0.329

FIG. 9

CALIBRATION APPARATUS AND METHOD FOR ASSISTING ACCURACY CONFIRMATION OF PARAMETER FOR THREE-DIMENSIONAL MEASUREMENT

This application is based on Japanese Patent Application No. 2009-059920 filed with the Japanese Patent Office on Mar. 12, 2009 and Japanese Patent Application No. 2010-004929 filed with the Japanese Patent Office on Jan. 13, 2010, the entire content of which is hereby incorporated by reference.

BACKGROUND OF THE INVENTION

1. Technical Field

The present invention relates to processing (calibration) for computing a parameter used to compute a three-dimensional coordinate in order to perform three-dimensional measurement processing in which a set of stereo images is used.

2. Related Art

In order to perform the three-dimensional measurement with a stereo camera, it is necessary to obtain a perspective transformation matrix P in a transformation equation expressing a relationship between a coordinate system of each camera constituting the stereo camera and a world coordinate system (see the following equations (1) and (2)). In the equation (1), $\lambda$ is a scale factor.

[Formula 1]

$$\lambda \begin{bmatrix} x \\ y \\ 1 \end{bmatrix} = P \begin{bmatrix} X \\ Y \\ Z \\ 1 \end{bmatrix} \quad (1)$$

$$P = \begin{bmatrix} P_{00} & P_{01} & P_{02} & P_{03} \\ P_{10} & P_{11} & P_{12} & P_{13} \\ P_{20} & P_{21} & P_{22} & P_{23} \end{bmatrix} \quad (2)$$

In the perspective transformation matrix P, elements $P_{00}$, $P_{01}$, ..., $P_{23}$ reflect internal parameters (such as a focal distance, resolution, and an image center) of the camera and parameters (such as a rotation deviation amount between a world coordinate system and a camera coordinate system and a position deviation amount of an origin of each coordinate system) caused by a position and an attitude of the camera. In conventional calibration processing, at least four sets of two-dimensional coordinates (x, y) and three-dimensional coordinates (X, Y, Z) of the camera coordinate system are obtained in each camera, and the coordinates of each set is substituted for the equation (1) to form a simultaneous equation with multiple unknowns in which each element in the matrix P is set to an unknown. The most preferable value of each element is specified by a least square method and the like.

For example, there is disclosed a method for simply deriving the coordinates used to compute the equation (1) (see Technique for Camera Calibration", Microsoft Research Microsoft Corporation, Feb. 2, 2009, the Internet, URL: http://research.microsoft.com/en-us/um/people/zhang/calib/ and Japanese Unexamined Patent Publication No. 2006-250889). In Technique for Camera Calibration", Microsoft Research Microsoft Corporation, Feb. 2, 2009, the Internet, URL:http://research.microsoft.com/en-us/um/people/zhang/calib/, a flat-plate workpiece in which a two-dimensional calibration pattern constituting marks arrayed at equal intervals are provided is imaged at least twice while a height and an orientation of the workpiece are changed, a feature point corresponding to each mark is extracted from each image produced by the imaging, and the coordinate of the world coordinate system is specified from a relationship among the feature points.

In the method of Japanese Unexamined Patent Publication No. 2006-250889, transparent sheets in which different calibration patterns are provided are imaged while disposed on the level with a predetermined interval, whereby a number of feature points necessary for the calibration pattern can be obtained by one-time imaging.

The inventor notices the following problem in the development of the general-purpose three-dimensional visual sensor.

In the calibration processing for obtaining the three-dimensional measurement parameter, the setting of the simultaneous equation with multiple unknowns and the computation for solving the unknown are automatically performed with a computer, while a user performs work for placing a calibration pattern in a space. Accordingly, when the calibration pattern is improperly disposed with respect to the camera, or when a jig in which the pattern is formed becomes dirty, the parameter cannot be computed with high accuracy, which results in a problem in that the accuracy of three-dimensional measurement is lowered.

Therefore, after the parameter is set, preferably a confirmation whether or not the parameter is proper is made by test measurement with a model whose three-dimensional shape is well known. However, in such cases, unfortunately it is necessary to image the model and it is necessary to previously obtain the correct three-dimensional information.

Particularly a user who uses a visual sensor in applications (for example, processing for detecting a height to determine whether the height is proper) in which the three-dimensional matching processing is not required probably has no pieces of three-dimensional information such as CAD data. Frequently found is a user who performs matching processing performs work for registering the three-dimensional model of a recognition object after the calibration. Possibly the user starts the actual processing without confirming the accuracy of parameter set by the calibration.

SUMMARY

The present invention has been devised to solve the problems described above, and an object thereof is to enhance the user-friendliness of the apparatus by being able to easily confirm the accuracy of the computed parameter when the computation of the three-dimensional measurement processing parameter is completed.

In accordance with a first aspect of the invention, a calibration apparatus in which at least one set of stereo images is inputted to extract at least four feature points of a calibration workpiece from the stereo image, the stereo image being produced by performing stereo imaging of the calibration workpiece in which plural feature points whose positional relationship is well known can be extracted from an image produced by imaging, and a parameter for three-dimensional measurement is computed using the feature points, the calibration apparatus includes: a tentative measurement unit that performs three-dimensional coordinate computing processing using the computed parameter for the plural feature points included in the stereo image used to compute the parameter; a perspective transformation unit that performs perspective transformation of the three-dimensional coordinate of each feature point computed by the tentative measurement unit and produces a projection image in which each post-perspective-transformation feature point being expressed by a predetermined pattern; and a display control unit that displays the projection image produced by the perspective transformation unit on a monitor device.

Accordingly, after the parameter for three-dimensional measurement is computed, the three-dimensional coordinate computing processing is performed using the computed parameter for the plural feature points included in the stereo image used in the parameter computing processing, and the a projection image expressing the distribution state of the three-dimensional coordinate of each feature point can be displayed. At this point, when the feature points in the projection image exhibit the distribution pattern similar to that of the actual calibration workpiece, it is considered that the parameter is properly computed to be able to secure the accuracy of three-dimensional measurement. On the other hand, when the feature points in the projection image exhibit the distribution pattern different from that of the calibration workpiece, it can be evaluated that the parameter is incorrectly computed.

The feature point that becomes the tentative measurement object is not limited to the feature point used to compute the parameter. Any feature point can be used as the tentative measurement object as long as the feature point is commonly included in each image constituting the stereo image used to compute the parameter.

Thus, the tentative measurement is performed to the feature points in the stereo image used in the calibration processing, and the measurement result is displayed as the projection image expressing the feature point distribution pattern, so that the user can easily determine whether or not the setting parameter is proper. The necessity of the model for test measurement or the preparation of the three-dimensional information is eliminated, the projection image is rapidly displayed after the parameter is computed, and the confirmation whether or not the parameter is proper can be made.

In the calibration apparatus according to the first aspect of the invention, preferably the display control unit obtains a degree of deviation of a pre-perspective-transformation three-dimensional coordinate to the well-known positional relationship of the feature points for each feature point included in the projection image and determines a display mode of each feature point according to the degree of deviation.

For example, a distance between the three-dimensional coordinate obtained from the positional relationship among the well-known feature points and the three-dimensional coordinate computed by the tentative measurement can be computed as the degree of deviation. When the feature points are distributed in one plane, a distance between the three-dimensional coordinate computed by the tentative measurement and the plane in which feature points are distributed may be computed as the degree of deviation in each feature point.

In the processing for determining the display mode of each feature point, for example, the determination is made such that the feature point having the maximum degree of deviation or the feature point whose degree of deviation exceeds a predetermined reference value and other feature points are displayed by different patterns. Alternatively, some numerical ranges are set in the degree of deviation, different display modes are correlated with the numerical ranges, and each feature point may be displayed by the display mode corresponding to the degree of deviation.

Accordingly, the feature point having the low restoration accuracy of the three-dimensional coordinate or the feature point having the restoration accuracy that does not reach a reference can easily be recognized in the feature points displayed in the projection image. Additionally, the factor that causes the degraded accuracy of parameter can be analyzed by understanding a relationship with the position of the defective feature point or another feature point in the three-dimensional coordinate distribution of the feature points.

In the calibration apparatus according to the first embodiment, preferably the tentative measurement unit performs processing for computing three-dimensional coordinates of plural feature point included in at least one set of stereo images used in the parameter computing processing, when the parameter computing processing is performed using plural sets of stereo images that are produced by performing the stereo imaging plural times to a calibration workpiece, the calibration workpiece having a plane that is designed to be able to extract the plural feature points from the image produced by the imaging. The display control unit obtains a distance from a plane including the feature points of the calibration workpiece to the three-dimensional coordinate as a degree of deviation of a pre-perspective-transformation three-dimensional coordinate of the feature point to the plane including the feature points of the calibration workpiece for the plural feature points that are extracted from the identical set of stereo images, processed by the tentative measurement unit and the perspective transformation unit, and included in the projection image, and the display control unit determines a display mode of each feature point according to the degree of deviation.

Accordingly, the plural feature points that should be distributed in the plane are displayed in the mode corresponding to the degree of deviation to the plane in which the feature points should be distributed, so that the restoration accuracy of the three-dimensional coordinate in each feature point can easily be recognized in addition to the confirmation whether or not the accuracy of parameter is proper.

In accordance with a second aspect of the invention, a method for assisting accuracy confirmation of a parameter for three-dimensional measurement in which at least four feature points of a calibration workpiece are extracted from at least one set of stereo images, the stereo image being produced by performing stereo imaging of the calibration workpiece in which plural feature points whose positional relationship is well known can be extracted from an image produced by imaging, and the parameter for three-dimensional measurement is computed using the feature points. The method includes the steps of: performing three-dimensional coordinate computing processing using the computed parameter for the plural feature points included in the stereo image used in the parameter processing; and performing perspective transformation of the three-dimensional coordinate of each feature point obtained by the three-dimensional coordinate computing processing, producing a projection image in which each post-perspective-transformation feature point is expressed by a predetermined pattern, and displaying the projection image on a monitor device.

When the method of the second aspect of the invention is applied to the three-dimensional visual sensor having the well-known configuration, the function of displaying the accuracy of parameter after the calibration can be set to the three-dimensional visual sensor. The method of the second aspect of the invention is not limited to the three-dimensional visual sensor. For example, the method can be performed by a personal computer to which the calibration processing result or the stereo image used to compute the parameter is inputted from the three-dimensional visual sensor.

According to the calibration apparatus and the method for assisting the accuracy confirmation of the parameter, the projection image can be displayed such that the accuracy of parameter used in the three-dimensional measurement can visually be recognized according to the computed parameter. Therefore, the user can rapidly confirm the accuracy of the three-dimensional parameter without feeling a burden after the calibration work, and the user-friendliness is considerably enhanced.

DETAILED DESCRIPTION

Figure 1:
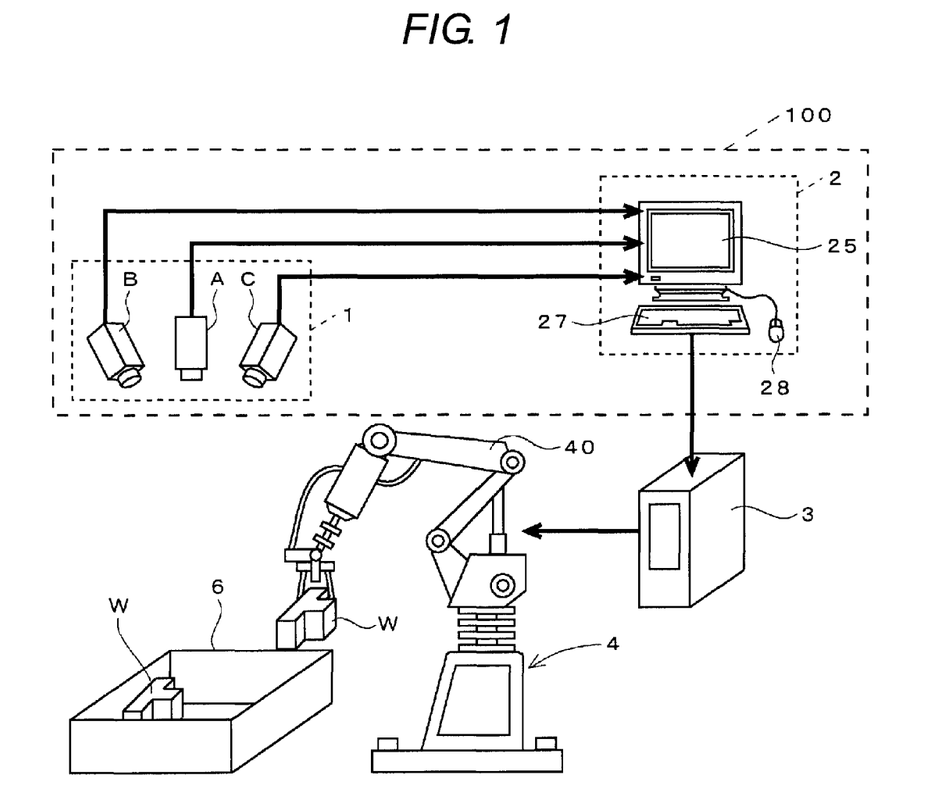
FIG. 1 illustrates a configuration of a picking system to which a three-dimensional visual sensor is introduced.

FIG. 1 illustrates an example of a picking system to which a three-dimensional visual sensor is introduced.

The picking system of FIG. 1 performs work for singly taking out a workpiece W, accommodated in an accommodation box 6 in a factory, to convey the workpiece W to a predetermined position. The picking system includes a three-dimensional visual sensor 100 that recognizes the workpiece W, a multi-joint robot 4 that performs actual work, and a robot control device 3 that controls operation of the robot 4.

The three-dimensional visual sensor 100 includes a stereo camera 1 and a recognition processing device 2.

The stereo camera 1 includes three cameras A, B, and C. The central camera A is disposed while an optical axis of the central camera A is orientated toward a vertical direction (that is, the central camera A squarely sees the workpiece W in the accommodation box 6). The right and left cameras B and C are disposed while optical axes are inclined, and an attitude of each of the cameras B and C is adjusted such that rotation angles about a vertical axis of each imaging surface with respect to an imaging surface of the camera A falls within 90 degrees.

The recognition processing device 2 is a personal computer in which a dedicated program is stored. In the recognition processing device 2, after images produced by the cameras A, B, and C are captured to perform three-dimensional measurement to a contour of the workpiece W, three-dimensional information restored by the measurement is checked with a previously-registered three-dimensional model, thereby recognizing the position and attitude of the workpiece W. Then the recognition processing device 2 outputs a three-dimensional coordinate expressing the position of the recognized workpiece W and a rotation angle (expressed in each of X-, Y-, and Z-axes) of the workpiece W with respect to the three-dimensional model to the robot control device 3. Based on the pieces of information, the robot control device 3 controls operation of an arm 40 of the robot 4 to grasp the workpiece W.

Figure 2:
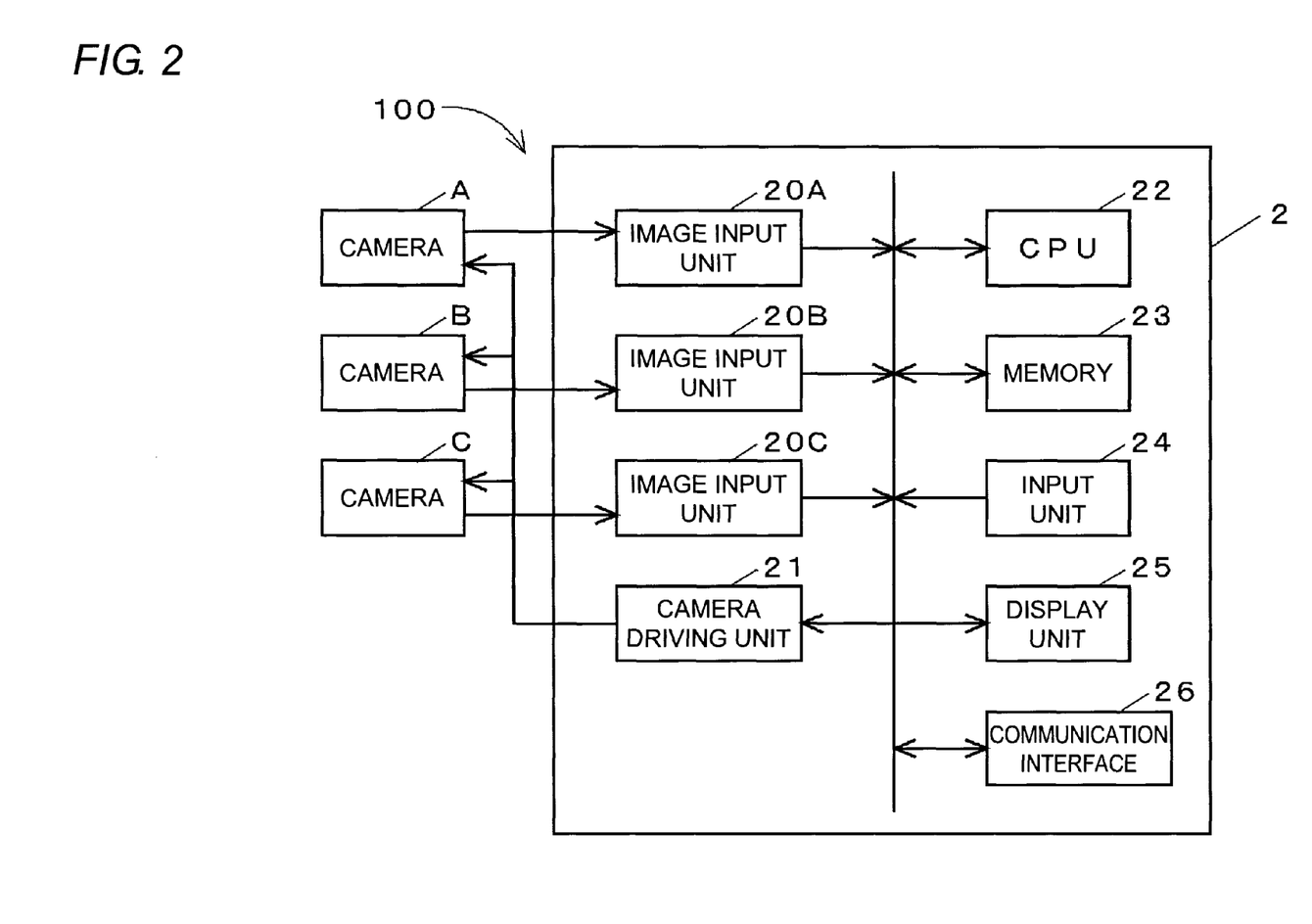
FIG. 2 is a block diagram illustrating an electric configuration of the three-dimensional visual sensor.

FIG. 2 is a block diagram illustrating a configuration of the three-dimensional visual sensor 100.

Referring to FIG. 2, the recognition processing device 2 includes image input units 20A, 20B, and 20C corresponding to the cameras A, B, and C, a camera driving unit 21, a CPU 22, a memory 23, an input unit 24, a display unit 25, and a communication interface 26.

The camera driving unit 21 simultaneously drives the cameras A, B, and C in response to a command provided from the CPU 22. When calibration processing or three-dimensional model registering processing is performed, the camera is driven by receiving an instruction for starting the imaging from the input unit 24.

The display unit 25 is a monitor device of FIG. 1. The input unit 24 is a device in which a keyboard 27 and a mouse 28 of FIG. 1 are collected. In performing the calibration processing or three-dimensional model producing processing, the input unit 24 and the display unit 25 are used to input setting information and to display information for assisting the work.

The communication interface 26 is used to conduct communication with the robot control device 3.

The memory 23 includes a large-capacity memory such as ROM, RAM, and a hard disk. Programs for the calibration processing, the three-dimensional model producing processing, and the three-dimensional recognition processing of the workpiece W and setting data are stored in the memory 23. A three-dimensional measurement parameter and the three-dimensional model, computed through the calibration processing, are also registered in a dedicated area of the memory 23.

Based on the programs in the memory 23, the CPU 22 performs the processing for producing and registering the three-dimensional model of the workpiece W after computing and registering the three-dimensional measurement parameter. Therefore, the three-dimensional measurement and the three-dimensional recognition processing can be performed to the workpiece W by performing the two kinds of the setting processing.

The calibration processing that is performed first in the two kinds of the setting processing will be described in detail.

Figure 3:
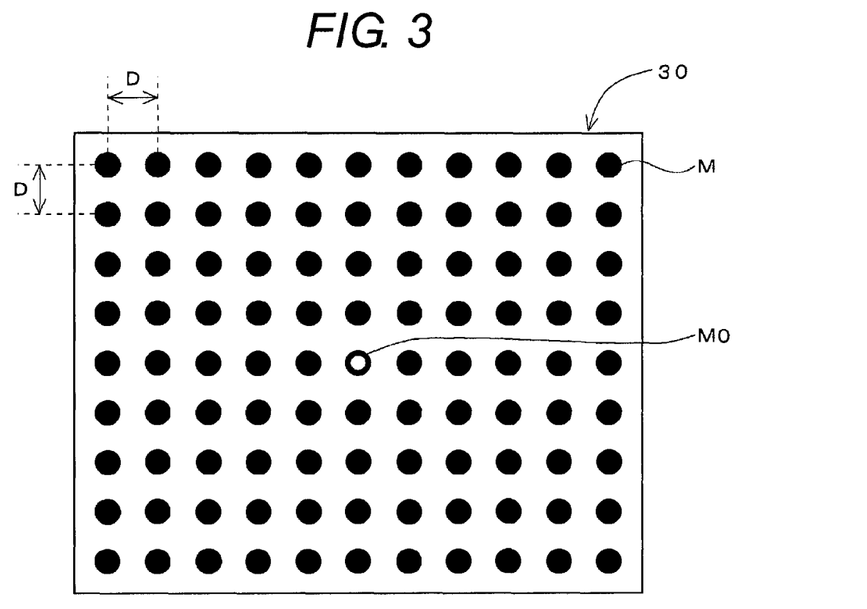
FIG. 3 illustrates a configuration example of a calibration plate.

In the embodiment, the three-dimensional measurement parameter is computed using a calibration plate 30 of FIG. 3. The calibration plate 30 is formed by drawing a two-dimensional calibration pattern in an upper surface of a white-background thin plate.

In the calibration pattern of FIG. 3, circular marks M having the same diameter two-dimensionally are arrayed at equal intervals. In FIG. 3, the letter D designates a distance between center points of the marks M. The marks M except the mark M0 located in the center are blacked out, and a white circle with a black outer circumference is disposed in the center mark M0. Alignment of the calibration plate 30 and recognition of a feature point are performed based on the mark M0.

Figure 4:
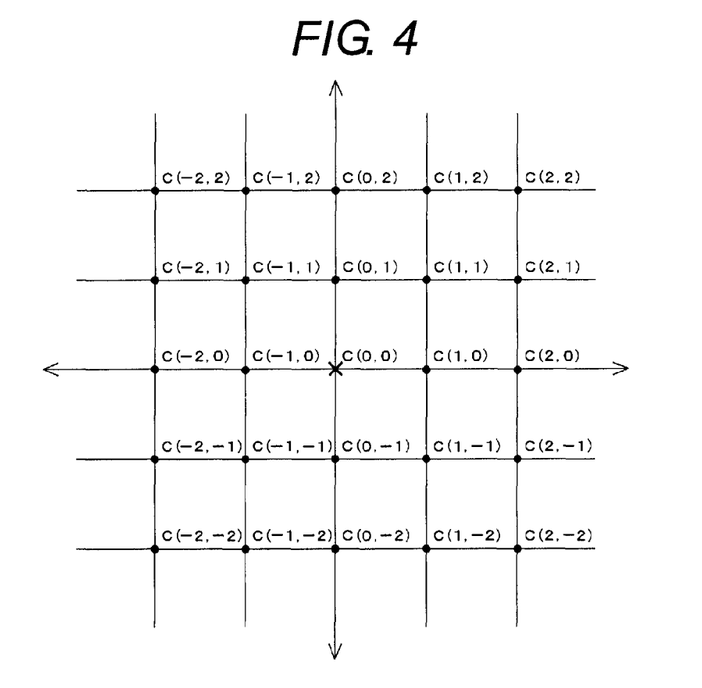
FIG. 4 illustrates an identification rule of each feature point in a calibration pattern.

FIG. 4 illustrates a rule for identifying the feature point of each mark M in the calibration plate 30.

In FIG. 4, the array of the marks M is replaced for an array of the center points of the marks M, and each center point is labeled as C (i, j). As to a value of each label C (i, j), the center point of the central mark M0 is set to C (0, 0), i is changed by 1 along a horizontal direction, and j is changed by 1 along a vertical direction.

In the calibration processing of the processing, at first the cameras A, B, and C perform the stereo imaging while the calibration plate 30 is set on the level. Then a height of the calibration plate 30 is changed while the calibration plate 30 is kept on the level, and the cameras A, B, and C perform the stereo imaging again. Specifically, the first-time stereo imaging is performed while the calibration plate 30 is placed on a flat surface. Then, a dedicated support base is disposed on the flat surface, and the second-time stereo imaging is performed while the calibration plate 30 is placed on the support base.

Figure 5:
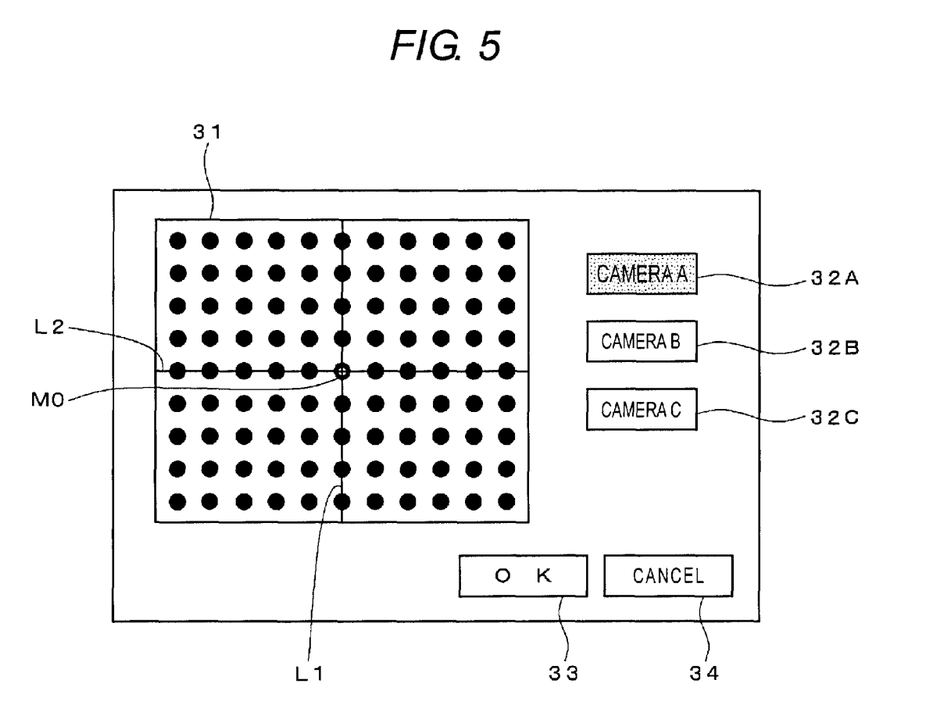
FIG. 5 illustrates a display screen in imaging the calibration plate.

In the embodiment, a screen of FIG. 5 is displayed on the display unit 25 to assist work for adjusting a positional relationship between the calibration plate 30 and the cameras A, B, and C during the above work. An image display region 31, selection buttons 32A, 32B, and 32C (corresponding to the cameras A, B, and C) that are used to specify an object image displayed on the region 31, an OK button 33, and a cancel button 34 are provided on the screen. A line L1 along the vertical direction and a line L2 along the horizontal direction are displayed in the image display region 31 so as to pass through the center position of the region 31. The lines L1 and L2 are superimposed on the image while kept always constant irrespective of a change of image display in the region 31.

In the first-time stereo imaging, a user adjusts the position and attitude of the calibration plate 30 from the image display of the squarely viewing camera A such that the central mark M0 is located in the substantial center of a view field of the camera A and such that the arrays of the marks including the mark M0 in the vertical direction and horizontal direction substantially correspond to the lines L1 and L2.

Similarly the user confirms that a sufficiently large number of marks M including the mark M0 are included in the image display region 31 for the cameras B and C. When a sufficiently large number of marks M are not included in the region 31, the user adjusts the positions or the optical axes of the cameras B and C. When the confirmation and adjustment are ended, the user manipulates the OK button 33 to provide an instruction for starting the imaging.

In the calibration plate 30 of the first embodiment, because the marks are disposed at equal intervals, a correspondence relationship between the vertical and horizontal directions of the calibration plate 30 and the lines L1 and L2 may be reversed. The calibration plate 30 may be placed such that the vertical and horizontal arrays of the marks M are inclined with respect to the lines L1 and L2. However, it is noted that an angle formed between the array of the marks M and the lines L1 and L2 does not become around 45 degrees. When the angle formed between the array of the marks M and the lines L1 and L2 becomes around 45 degrees, the result of correlation between the array of the marks M and the lines L1 and L2 varies depending on the imaging direction (for example, the array direction correlated with the line L1 in the image of the camera A is correlated with the line L2 in the images of the cameras B and C), and there is a risk that the labeling results are not matched with one another among the images.

In the second-time stereo imaging, the calibration plate 30 is disposed in the view field of each of the cameras A, B, and C in the similar way, and it is necessary that the positions of the cameras A, B, and C and the orientation of the optical axis be identical to those of the first-time stereo imaging.

Figure 6:
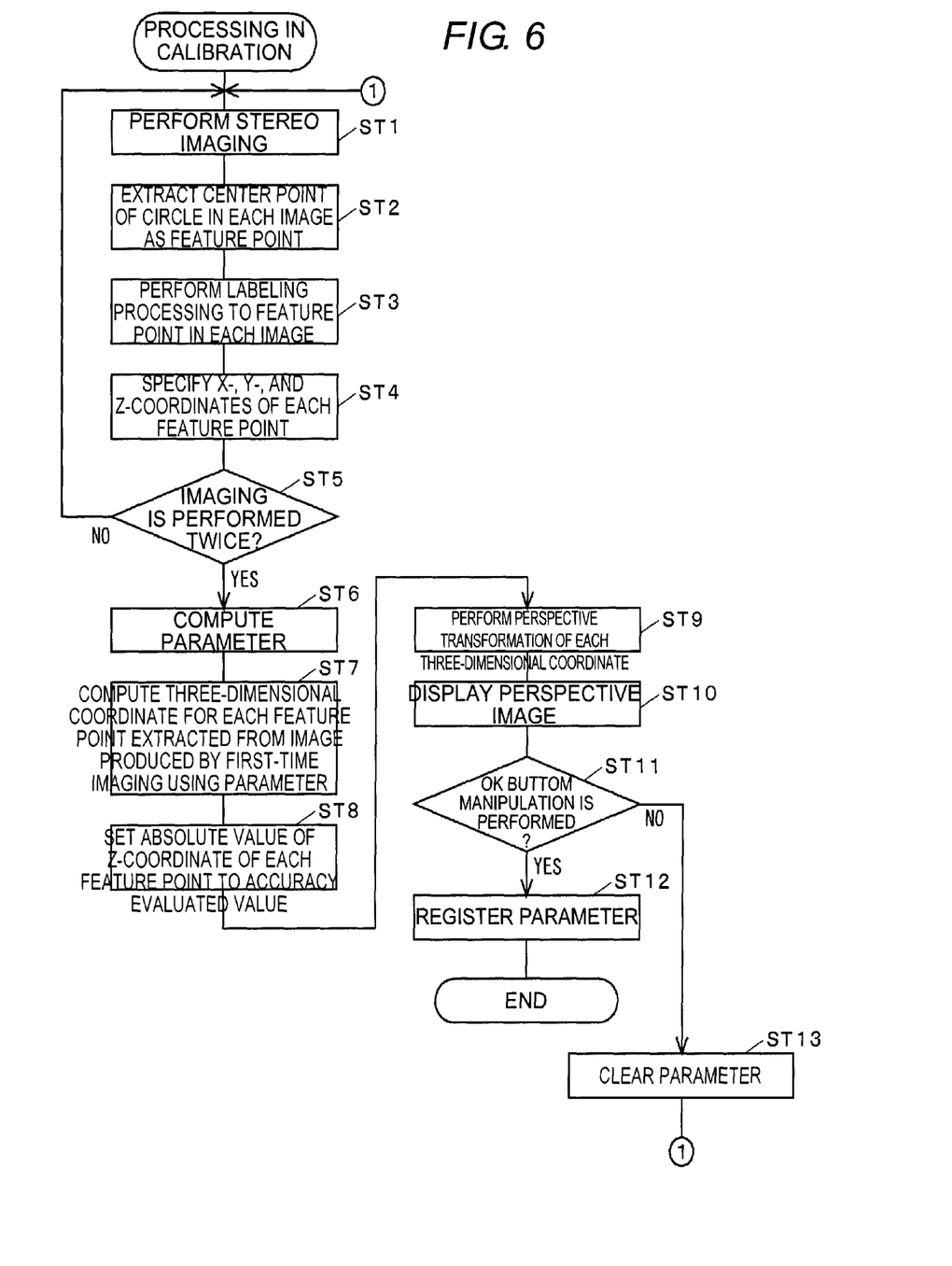
FIG. 6 is a flowchart illustrating a processing procedure in calibration.

FIG. 6 illustrates a string of procedures performed by the CPU 22 in the calibration processing. The calibration processing will be described in detail with reference to FIG. 6 and other drawings.

In the calibration processing, the first-time stereo imaging is performed as described above (ST1). Then the circle expressing the mark M is extracted in each of the images produced by the cameras A, B, and C, and the center point of the circle is extracted as the feature point of each mark M (ST2).

In Step ST3, feature point of each image is labeled to specify the correspondence relationship of the feature point among the images and the correspondence relationship between the feature point and the actual mark M. Specifically, first the mark M0 is recognized from an appearance feature, and the feature point of the mark M0 is labeled as C (0, 0). Then a search range having a predetermined angle width in the vertical and horizontal directions is set based on the reference point C (0, 0), and the feature point closest to the reference point C (0, 0) is extracted within the range. The vertical and horizontal array directions of the feature points are specified based on the direction in which the extracted feature points are arrayed across the reference point C (0, 0) from each other. The positional relationship of other feature points and the reference point C (0, 0) is determined from each array direction, and the label C (i, j) of each feature point is determined by applying the labeling rule of FIG. 4 to the positional relationship.

In the embodiment, consistency of the correspondence relationship between the array direction of the marks M and the lines L1 and L2 is secured because a rotation deviation amount about the vertical axis direction between the imaging surfaces of the cameras falls within 90 degrees. Therefore, because the same label can be placed to the feature points having the correspondence relationship among the images, the mark corresponding to a set of the feature points placed by the same label is uniquely determined every set in the actual calibration pattern.

In Step ST4, X-, Y-, and Z-coordinates of each feature point are specified using a reference image produced by the camera A.

In the embodiment, a world coordinate system is defined by utilizing the calibration plate 30 placed on the level surface such that a plane including the feature points specified from one set of stereo images produced by the first-time stereo imaging becomes a reference surface having a height (Z-coordinate) of zero. Specifically, the actual position of the reference point C (0, 0) obtained from the mark M0 is set to an origin (0, 0, 0), the horizontal array direction passing through the reference point C (0, 0) is set to an X-axis direction and the vertical array direction passing through the reference point C (0, 0) is set to a Y-axis direction.

In the setting, the world coordinate system is defined such that the feature points are arrayed along the X-axis and Y-axis of the world coordinate system according to the first-time stereo imaging. Therefore, in the three-dimensional coordinate of the feature point C (i, j) specified in the first-time stereo imaging, the X-coordinate (Xij) and the Y-coordinate (Yij) can be obtained by the following computation using a distance D between the center points of the marks M of the calibration pattern:

$$Xij = i*D, Yij = j*D$$

The Z-coordinates (Zij) of all the feature points are set to zero.

The processing for extracting the feature point of the mark M (ST2) and the labeling processing (ST3) are performed to the second-time stereo imaging in the way similar to that of the first-time stereo imaging, and the X-, Y-, and Z-coordinates of each feature point C (i, j) are obtained (ST4). At this point, the squarely viewing image produced by the current imaging is checked with the squarely viewing image produced by the first-time imaging, thereby obtaining not only a positional deviation amount of the reference point C (0, 0) in the image but also a rotation deviation amount with respect to the first-time imaging in the vertical and horizontal mark array directions. The X- and Y-coordinates are obtained in each set of the feature points correlated with one another by the label among the cameras A, B, and C by the technique similar to that of the first-time stereo imaging, and the X- and Y-coordinates are corrected by the positional deviation amount and the rotation deviation amount. On the other hand, a value in which a thickness of the calibration plate 30 is added to a height of the post-change calibration plate 30 is uniformly substituted for the Z-coordinate (Zij).

The plural feature points are extracted from a total of six images produced by twice stereo imaging of three cameras A, B, and C, and the three-dimensional coordinate corresponding to each feature point is specified.

Then the three-dimensional coordinate of each feature point and the two-dimensional coordinate in the image are combined when correlated with one another in the cameras, and the combination of the three-dimensional coordinate and the two-dimensional coordinate is substituted from the computing expression (equation (1)) of the perspective transformation, the perspective transformation matrix P is obtained by a least square method. When at least four feature points in total are extracted from the images produced by the twice stereo imaging for each camera to substitute the three-dimensional coordinates and two-dimensional coordinates of the feature points for the equation (1), the 12 elements $P_{00}$ to $P_{23}$ of the matrix P in the equation (1) can be obtained.

The matrix P obtained every camera becomes the three-dimensional measurement parameter.

As described above, in the embodiment, after the stereo imaging is performed twice while the height of the calibration plate 30 is changed, the three-dimensional measurement parameter is computed (ST1 to ST6). Therefore, when the computed parameter is registered, the full-fledged three-dimensional measurement can be started.

However, in the embodiment, because a general user advances the calibration work, occasionally the calibration plate 30 is insufficiently aligned with the cameras A, B, and C, or part of the calibration plate 30 becomes dirty to degrade extraction accuracy of the feature point. Therefore, possibly there is a risk that parameter accuracy is not secured. In the embodiment, when the parameter computing processing is ended (ST6), the user is caused to confirm the accuracy of the computed parameter by performing Steps ST7 to ST10.

In ST7, using the computed parameter, the three-dimensional coordinate is computed for the feature point extracted from each image produced by the first-time stereo imaging. In ST8, for each feature point, an absolute value of the Z-coordinate in the three-dimensional coordinate computed in ST7 is set to an evaluate value (hereinafter referred to as "accuracy evaluate value") that measure the accuracy of the three-dimensional coordinate of the feature point.

In ST9, a perspective transformation of the three-dimensional coordinate computed for feature point into the two-dimensional plane is performed by predetermined point of view and direction. In ST10, projection images of FIGS. 7 and 8 are produced based on the perspective transformation result and displayed on the display unit 25.

Figure 7:
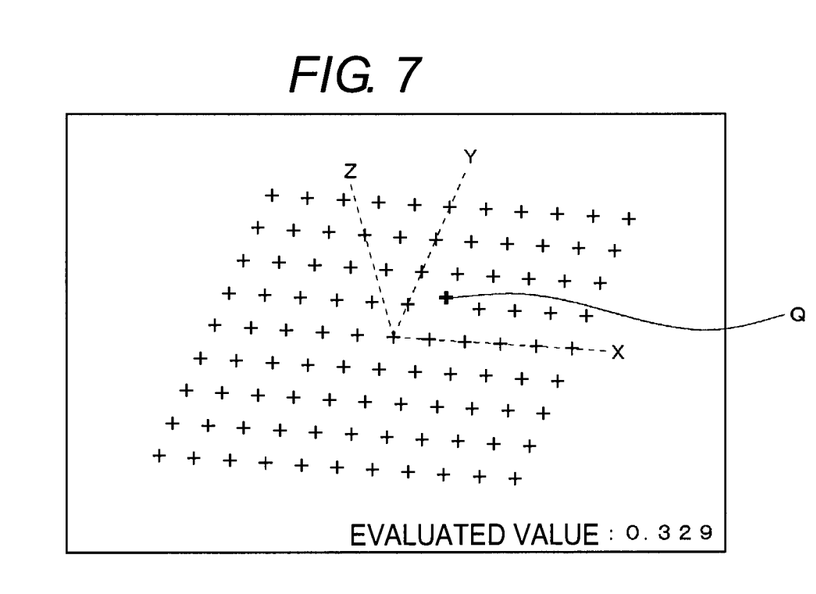
FIG. 7 illustrates a display example of a projection image.

In the projection image of FIG. 7, the perspective transformation of a feature point group of the computed three-dimensional coordinates is performed from the direction oblique to the X- and Y-axes while the point of view is set to the position higher than zero. On the other hand, in the projection image of FIG. 8, the perspective transformation of the feature point group similar to that of FIG. 7 is performed from the position (corresponding to the height of zero) right beside the feature point group.

Figure 8:
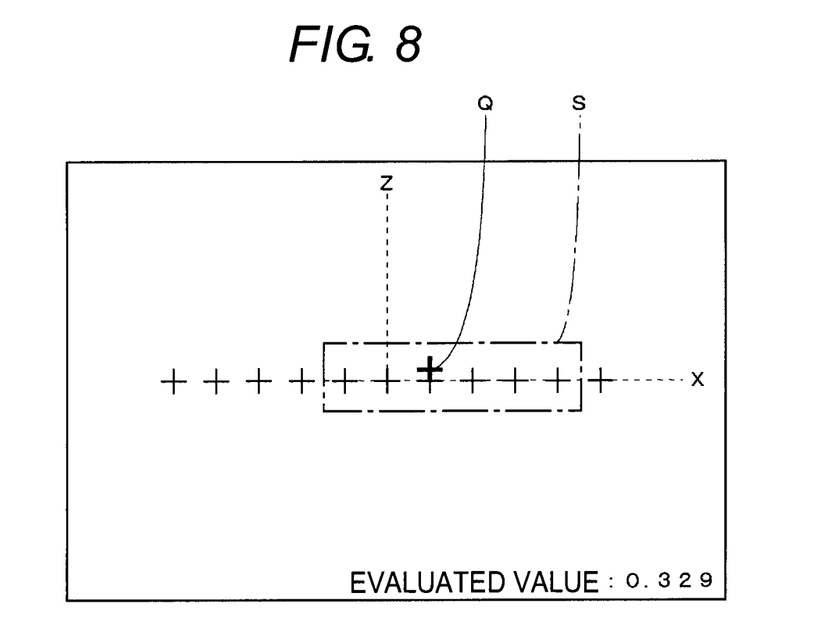
FIG. 8 illustrates a display example of a projection image by perspective transformation from a direction different from that of FIG. 7.

In the projection image of FIGS. 7 and 8, each feature point is expressed by a pattern "+", and line drawings expressing the X-, Y-, and Z-axes of the three-dimensional coordinate system are also displayed. In FIGS. 7 and 8, the letter Q designates the feature point having the minimum accuracy evaluate value, and the feature point Q is expressed by a color different from that of other feature points (in FIGS. 7 and 8, the feature point Q is expressed by an extra-thick-line mark "+" instead of color). A specific accuracy evaluated value of the feature point Q is displayed in the lower right of the display screen of the perspective image.

Because each feature point indicated by the projection image is included in the same calibration pattern, the feature points in the image should averagely be distributed. Accordingly, the user can easily determine whether or not the accuracy of three-dimensional measurement is secured based on whether or not the feature points in the projection image is averagely distributed. The determination of the good accuracy of three-dimensional measurement means that the parameter is accurately computed.

In the embodiment, as illustrated in FIGS. 7 and 8, the feature point distribution state can be confirmed from various directions by changing the point of view and the projection direction of the perspective transformation processing according to the user's manipulation.

Figure 9:
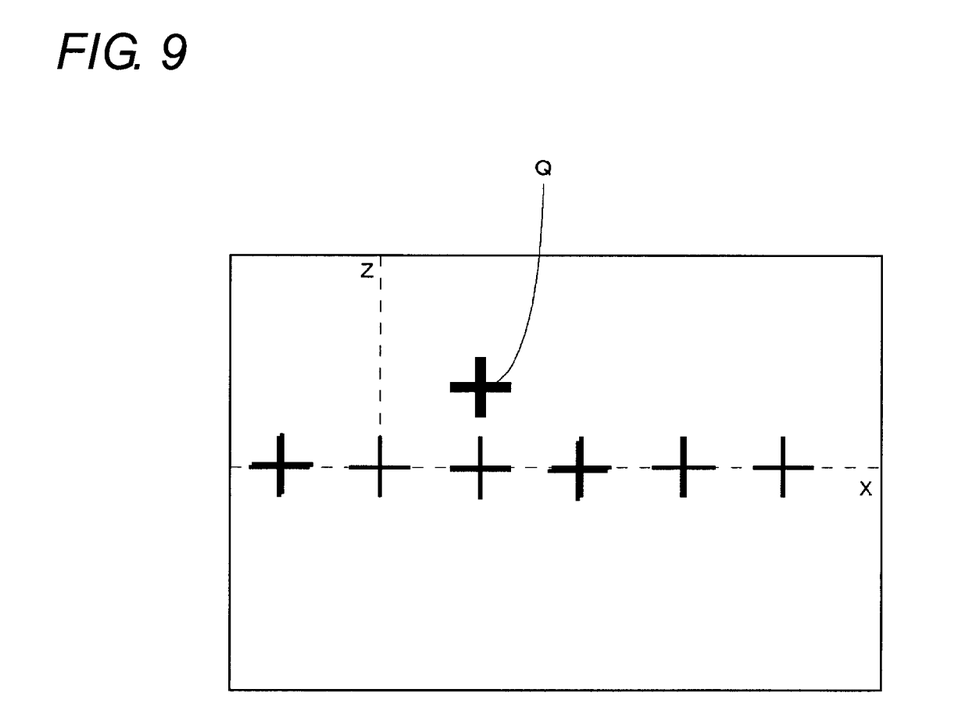
FIG. 9 illustrates an example in which part of the projection image of FIG. 8 is enlarged and displayed.

Further, in the embodiment, part of a range of the projection image is specified and the specified range can also be displayed while enlarged. In FIG. 8, the specified range is indicated by a region S of an alternate long and short dash line. FIG. 9 illustrates an example in which the feature point distribution in the specified range S is displayed while enlarged. In the enlarged view, a micro deviation exists between the feature points even in the neighborhood of the height of Z=0, and a difference between the micro deviation and the deviation amount of feature point Q having the minimum accuracy evaluate value can be confirmed.

In each projection image, the feature point having the minimum accuracy evaluate value is displayed by the color different from that of other feature points. Alternatively, all the feature points whose accuracy evaluate values exceed a predetermined reference value may be displayed by the color different from that of other feature point. Alternatively, plural numerical ranges are provided in the accuracy evaluate value, different colors are correlated with the numerical ranges, and the display color may be determined by the numerical range of the accuracy evaluate value of each feature point.

Referring to FIG. 6, the description will be continued. The user determines the accuracy of measurement result with the projection image. When the measurement result has the good accuracy, the user manipulates an OK button (not illustrated, but the OK button is set in the image on the display screen of FIGS. 7 and 9). When the user manipulates the OK button ("YES" in ST11), the computed parameter is registered (ST12), and the processing is ended.

On the other hand, when the measurement result has the poor accuracy, the user performs a cancel manipulation ("NO" IN ST11), the computed parameter is cleared (ST13). After the calibration procedure is reviewed, the processing is started again from the beginning.

In the processing, the projection image expressing the accuracy of three-dimensional measurement with the parameter immediately after the three-dimensional measurement parameter is computed. Therefore, when determining that the parameter is improperly set from the displayed image, the user can rapidly resume the calibration processing to compute the parameter again. The necessity for the preparation for the test measurement and the new imaging is eliminated by utilizing the feature points used in the calibration processing, so that the processing can be enhanced without burdening the user.

The projection image is not limited to one corresponding to the first-time stereo imaging, but the similar projection image can be produced and displayed for the feature point extracted from the second-time stereo imaging. In such cases, an absolute value of a difference between the height at which the calibration plate 30 is set in the second-time imaging and the Z-coordinate computed in each feature point can be obtained as the accuracy evaluate value of each feature point.

In the embodiment, for the sake of convenience of the calibration work and data processing, the stereo imaging is performed twice while the calibration plate 30 is set on the level. When the calibration patterns provided in the two sets of transparent sheets are used as described in Japanese Unexamined Patent Publication No. 2006-250889, the feature points necessary to compute the parameter can be obtained by the one-time stereo imaging.

On the other hand, although the number of imaging times is increased, the position and attitude of the calibration plate 30 may arbitrarily be set to perform the stereo imaging many times. However, at this point, because the Z-coordinate of each feature point cannot be specified before the parameter is computed, it is necessary to obtain an alternative to the accuracy evaluate value based on the Z-coordinate. For example, a plane approximate to the three-dimensional coordinate of each feature point obtained from the computed parameter is specified, and a distance from each feature point to the plane is determined, and the distance may be adopted as the accuracy evaluate value.

Alternatively, after the calibration is performed with a solid calibration workpiece instead of the calibration plate 30, the display similar to that of the embodiment may be performed to the plural feature points included in the same plane of the calibration workpiece.

Alternatively, in addition to the feature points existing in the same plane, the three-dimensional coordinate is computed in each of the feature points used in the calibration using the parameter computed by the calibration, and the perspective transformation of the three-dimensional-coordinate distribution pattern in which the feature points are computed and the perspective transformation of correct three-dimensional-coordinate distribution pattern that is determined from the well-known positional relationship among the feature points of the calibration workpiece may be performed into the same plane and displayed in different colors. Alternatively, a distance between the three-dimensional coordinate with the parameter computed by the calibration and the correct three-dimensional coordinate are computed as the accuracy evaluate value of each feature point, and a projection image in which the color or the pattern shape is classified according to the accuracy evaluate value may be displayed.

What is claimed is:

1. A calibration apparatus in which at least one set of stereo images is inputted to extract at least four feature points of a calibration workpiece from the stereo image, the stereo image being produced by performing stereo imaging of the calibration workpiece in which a plurality of feature points whose positional relationship is well known can be extracted from an image produced by imaging, and a parameter for three-dimensional measurement is computed using the feature points, the calibration apparatus comprising:

a tentative measurement unit configured to perform three-dimensional coordinate computing processing using the computed parameter for the plurality of feature points included in the stereo image used to compute the parameter;

a perspective transformation unit configured to perform perspective transformation of the three-dimensional coordinate of each feature point computed by the tentative measurement unit and to produce a projection image in which each post-perspective-transformation feature point is expressed by a predetermined pattern; and a display control unit configured to display the projection image produced by the perspective transformation unit on a monitor device;

wherein the tentative measurement unit is configured to perform processing for computing three-dimensional coordinates of a plurality of feature points included in at least one set of stereo images used in the parameter computing processing, when the parameter computing processing is performed using a plurality of sets of stereo images that are produced by performing the stereo imaging a plurality of times to a calibration workpiece, the calibration workpiece having a plane that is designed to be able to extract the plurality of feature points from the image produced by the imaging, and the display control unit is configured to obtain a distance from a plane including the feature points of the calibration workpiece to the three-dimensional coordinate as a degree of deviation of a pre-perspective-transformation three-dimensional coordinate of the feature point to the plane including the feature points of the calibration workpiece for the plurality of feature points that are extracted from an identical set of the plurality of sets of stereo images, processed by the tentative measurement unit and the perspective transformation unit, and included in the projection image, and the display control unit is configured to determine a display mode of each feature point according to the degree of deviation.

2. The calibration apparatus according to claim 1, wherein the display control unit is configured to obtain a degree of deviation of a pre-perspective-transformation three-dimensional coordinate to the well-known positional relationship of the feature points for each feature point included in the projection image and to determine a display mode of each feature point according to the degree of deviation.

3. A method for assisting accuracy confirmation of a parameter for three-dimensional measurement in which at least four feature points of a calibration workpiece are extracted from at least one set of stereo images, the stereo image being produced by performing stereo imaging of the calibration workpiece in which a plurality of feature points whose positional relationship is well known can be extracted from an image produced by imaging, and the parameter for three-dimensional measurement is computed using the feature points, the method comprising the steps of:

performing three-dimensional coordinate computing processing using the computed parameter for the plurality of feature points included in the stereo image used in the parameter processing; and performing perspective transformation of the three-dimensional coordinate of each feature point obtained by the three-dimensional coordinate computing processing, producing a projection image in which each post-perspective-transformation feature point is expressed by a predetermined pattern;

performing processing for computing three-dimensional coordinates of a plurality of feature points included in at least one set of stereo images used in the parameter computing processing, when the parameter computing processing is performed using a plurality of sets of stereo images that are produced by performing the stereo imaging a plurality of times to a calibration workpiece, the calibration workpiece having a plane that is designed to be able to extract the plurality of feature points from the image produced by the imaging;

obtaining a distance from a plane including the feature points of the calibration workpiece to the three-dimensional coordinate as a degree of deviation of a pre-perspective-transformation three-dimensional coordinate of the feature point to the plane including the feature points of the calibration workpiece for the plurality of feature points that are extracted from an identical set of the plurality of sets of stereo images, processed by the three-dimensional coordinate computing processing and the perspective transformation, and included in the projection image;

determining a display mode of each feature point according to the degree of deviation; and displaying the projection image on a monitor device.

\* \* \* \* \*